United States Patent [19]
Aoki et al.

[11] Patent Number: 5,432,229
[45] Date of Patent: Jul. 11, 1995

[54] AQUEOUS CROSSLINKABLE RESIN COMPOSITION

[75] Inventors: Masahiro Aoki; Takeo Tsukamoto; Ryutaro Hayashi; Yoshinori Kato; Takeshi Awata, all of Mie, Japan

[73] Assignee: Mitsubishi Yuka Badische Co., Ltd., Yokkaichi, Japan

[21] Appl. No.: 229,226

[22] Filed: Apr. 18, 1994

Related U.S. Application Data

[63] Continuation-in-part of Ser. No. 37,587, Mar. 26, 1993, abandoned.

[51] Int. Cl.$^6$ .................. C08L 29/12; C08L 29/14; C08F 8/32
[52] U.S. Cl. .................. 524/820; 524/401; 524/428; 524/812; 524/818; 524/832; 525/379; 525/381; 525/382
[58] Field of Search ............ 524/818, 812, 820, 832; 525/381, 382

[56] References Cited

U.S. PATENT DOCUMENTS

| | | | |
|---|---|---|---|
| 4,210,565 | 7/1980 | Emmons | 526/315 |
| 4,267,091 | 5/1981 | Geelhaar et al. | |
| 4,959,428 | 9/1990 | Abe | 526/315 |
| 5,208,282 | 5/1993 | Rehmer et al. | |

FOREIGN PATENT DOCUMENTS

| | | |
|---|---|---|
| 0005167 | 11/1979 | European Pat. Off. |
| 0219046 | 4/1987 | European Pat. Off. |
| 58-96643 | 6/1983 | Japan |
| 58-104902 | 6/1983 | Japan |
| 62-62851 | 3/1987 | Japan |
| 62-62852 | 3/1987 | Japan |
| 62-62853 | 3/1987 | Japan |
| 62-72742 | 4/1987 | Japan |
| 63-51180 | 10/1988 | Japan |
| 1-13501 | 3/1989 | Japan |
| 1-234416 | 9/1989 | Japan |
| 2-18466 | 1/1990 | Japan |
| 2-175742 | 7/1990 | Japan |
| 3-7227 | 2/1991 | Japan |
| 1421130 | 1/1976 | United Kingdom |

OTHER PUBLICATIONS

Chemical Abstracts, vol. 96, No. 24, Jun. 1982, AN-201337w, JP-A-82 003 850, Jan. 9, 1982.

*Primary Examiner*—Fred Zitomer
*Attorney, Agent, or Firm*—Oblon, Spivak, McClelland, Maier, & Neustadt

[57] ABSTRACT

An aqueous crosslinking resin composition comprising (I) an aqueous resin dispersion obtained by emulsion polymerization of a monomer mixture consisting of (a) 2 to 50% by weight of an unsaturated carboxylic acid monomer, (b) 0.5 to 60% by weight of a carbonyl-containing unsaturated monomer containing at least one carbonyl group based on an aldo group or a keto group, and (c) the remainder of at least one monomer(s) selected from the group consisting of alkyl acrylates or methacrylates having from 1 to 8 carbon atoms in the alkyl moiety thereof, glycidyl methacrylate, glycol mono- or diacrylates, glycol mono- or dimethacrylates, aromatic vinyl compounds, vinyl halides, vinylidene chloride, acrylonitrile, methacrylonitrile, saturated carboxylic acid vinyl esters, unsaturated carboxylic acid amides, N-alkyl and/or N-alkylol compounds of unsaturated carboxylic acid amides, unsaturated sulfonic acids, and hydroxyl-containing unsaturated compounds, and (II) a hydrazine compound having at least two hydrazino groups ($-NHNH_2$) per molecule, with the molar ratio of the hydrazino group in said hydrazine compound (II) to the carbonyl group in the resin of said aqueous resin dispersion (I) being from 0.05 to 5, and with the resin content in the aqueous resin dispersion (I) having been solubilized to a degree of at least 5% by weight by addition of sufficient amount of an alkali and/or water miscible organic solvent. The resin composition easily undergoes a crosslinking reaction at room temperature to provide a crosslinked film having excellent adhesion to a substrate, well-balanced resistance to water and solvents, excellent whitening resistance, and hardness.

11 Claims, No Drawings

AQUEOUS CROSSLINKABLE RESIN COMPOSITION

CROSS REFERENCE TO RELATED APPLICATION

This is continuation-in-part application of Ser. No. 08/037,587 filed Mar. 26, 1993 now abandoned.

FIELD OF THE INVENTION

This invention relates to an aqueous crosslinkable resin composition which readily undergoes a crosslinking reaction at room temperature to provide a crosslinked film excellent in water resistance, solvent resistance, adhesion to a substrate, such as a metal, an inorganic material, a plastic article, a coated article, etc., whitening resistance, and hardness.

BACKGROUND OF THE INVENTION

An aqueous crosslinkable resin composition comprising a carbonyl-containing resin aqueous emulsion obtained by emulsion copolymerization of a monomer containing a carbonyl group based on an aldo group or a keto group and a hydrazine derivative having at least two hydrazino groups (—NHNH$_2$) per molecule is known as disclosed, e.g., in JP-A-54-14432 (corresponding to U.S. Pat. No. 4,267,091) (the term "JP-A" as used herein means an "unexamined published Japanese patent application"). The resin composition of this type is advantageous in that it has room temperature crosslinkability and is of one-pack type easy to use, but still needs further improvement in terms of film properties, such as adhesion to a substrate, water resistance, and the like.

SUMMARY OF THE INVENTION

An object of the present invention is to provide an aqueous crosslinkable resin composition which provides a crosslinked film having markedly improved adhesion to a substrate, well-balanced resistance to water and solvents, and hardness.

The present invention relates to an aqueous crosslinkable resin composition comprising (I) an aqueous resin dispersion obtained by emulsion polymerization of a monomer mixture consisting of (a) 2 to 50% by weight of an unsaturated carboxylic acid monomer, (b) 0.5 to 60% by weight of a carbonyl-containing unsaturated monomer containing at least one carbonyl group based on an aldo group or a keto group, and (c) the remainder of at least one monomer(s) selected from the group consisting of alkyl acrylates or methacrylates having from 1 to 8 carbon atoms in the alkyl moiety thereof, glycidyl methacrylate, glycol mono- or diacrylates, glycol mono- or dimethacrylates, aromatic vinyl compounds, vinyl halides, vinylidene chloride, acrylonitrile, methacrylonitrile, saturated carboxylic acid vinyl esters, unsaturated carboxylic acid amides, N-alkyl and/or N-alkylol compounds of unsaturated carboxylic acid amides, unsaturated sulfonic acids, and hydroxyl-containing unsaturated compounds, and (II) a hydrazine compound having at least two hydrazino groups (—NHNH$_2$) per molecule, with the molar ratio of the hydrazino group in the hydrazine compound (II) to the carbonyl group in the resin of the aqueous resin dispersion (I) being from 0.05 to 5, and with the resin content in the aqueous resin dispersion (I) having been solubilized to a degree of at least 5% by weight by addition of sufficient amount of an alkali and/or water miscible organic solvent.

DETAILED DESCRIPTION OF THE INVENTION

Aqueous resin dispersion (I) which can be used in the present invention is an aqueous dispersion of a copolymer resin obtained by emulsion polymerization of a specific monomer mixture comprising monomers (a) to (c).

Unsaturated carboxylic acid monomer (a) includes unsaturated mono- and polycarboxylic acids having from 3 to 5 carbon atoms, such as acrylic acid, methacrylic acid, itaconic acid, and maleic acid. These unsaturated carboxylic acid monomers may be used either individually or in combination of two or more thereof.

Monomer (a) is used in an amount of from 2 to 50% by weight, preferably from 5 to 30% by weight, based on the monomer mixture. Where monomer (a) is used in an amount of from 5 to 15% by weight, the polymerization of monomers is preferably carried out in the presence of a chain transfer agent. On the other hand, where the amount of monomer (a) is from 15 to 30% by weight, since solubilization of the resulting polymer is easier than in the above-mentioned case, a chain transfer agent is not essential. However, use of a chain transfer agent is also preferred in this case for ensuring the ease of solubilization and the improvements in various physical properties.

Where aqueous resin dispersion (I) is prepared in the presence of a chain transfer agent, the resulting aqueous crosslinkable resin composition exhibits markedly improved film properties, especially adhesion to a substrate, probably because presence of a chain transfer agent reduces the molecular weight of the copolymer resin produced, which seems to facilitate the solubilization with an alkali and/or an organic solvent.

Any of chain transfer agents commonly employed for homo- or copolymerization of vinyl monomers can be employed. Examples of suitable chain transfer agents include mercaptan compounds, e.g., methyl mercaptan, t-butyl mercaptan, decyl mercaptan, benzyl mercaptan, lauryl mercaptan, stearyl mercaptan, n-dodecyl mercaptan, t-dodecyl mercaptan, mercaptoacetic acid, and mercaptopropionic acid; alcohols, e.g., methyl alcohol, n-propyl alcohol, isopropyl alcohol, t-butyl alcohol, benzyl alcohol, and allyl alcohol; hydrocarbons, e.g., ethylbenzene and cumene; and halogenated hydrocarbons, e.g., chloroethane, chloroform, carbon tetrachloride, and carbon tetrabromide.

The amount of the chain transfer agent used greatly influences solubilization of the dispersed resin. With the composition of the resin being equal, the larger the amount of the chain transfer agent, the more readily is the dispersed resin solubilized, leading to an increase in adhesion of the crosslinked film to a substrate. However, too high a level of addition results in reduction in water resistance and solvent resistance. A suitable amount of the chain transfer agent is usually from 0.01 to 3 parts by weight per 100 parts by weight of the solid resin content.

Carbonyl-containing unsaturated monomer (b) is a polymerizable unsaturated compound containing at least one carbonyl group based on an aldo group or a keto group. Therefore, polymerizable unsaturated monomers which contain a carbonyl group based on a carboxyl group, a carboxylic acid ester group, a carboxylic acid amido group, etc. are not included under carbonyl-containing-unsaturated monomer (b).

Specific examples of carbonyl-containing unsaturated monomer (b) include acrolein, diacetone acrylamide, formyl-styrol, a vinyl alkyl ketone having from 4 to 7 carbon atoms (e.g., vinyl methyl ketone, vinyl ethyl ketone or vinyl butyl ketone), diacetone acrylate, acetonyl acrylate, diacetone methacrylate, 2-hydroxypropyl acrylate acetylacetate, and butanediol-1,4-acrylate acetylacetate, and a (meth)acryloxyalkylpropenal represented by formula:

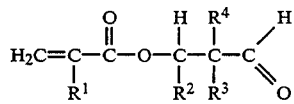

wherein $R^1$ represents a hydrogen atom or a methyl group; $R^2$ represents a hydrogen atom or an alkyl group having from 1 to 3 carbon atoms; $R^3$ represents an alkyl group having from 1 to 3 carbon atoms; and $R^4$ represents an alkyl group having from 1 to 4 carbon atoms.

Preferred of them are diacetone acrylamide, acrolein, and vinyl methyl ketone. These carbonyl-containing unsaturated monomers may be used either individually or in combination of two or more thereof.

Carbonyl-containing unsaturated monomer (b) is used in an amount of from 0.5 to 60% by weight, preferably from 2 to 30% by weight, more preferably from 4 to 20% be weight, based on the monomer mixture. If the proportion of monomer (b) is less than 0.5% by weight, the crosslink density achieved by the reaction with hydrazine derivative (II) is reduced, and the physical properties of the crosslinked film, such as water resistance and solvent resistance, are insufficient as a result. If the proportion of monomer (b) is more than 60% by weight, no further improvements can be obtained.

Other copolymerizable unsaturated monomer (c), selected from those exclusive of monomers (a) and (b), includes alkyl acrylates or methacrylates having from 1 to 8 carbon atoms in the alkyl moiety thereof (e.g., methyl, ethyl, isopropyl, n-propyl, n-butyl, isobutyl, or t-butyl ester of acrylic acid or methacrylic acid), glycidyl methacrylate, glycol mono- or diacrylates, glycol mono- or dimethacrylates, aromatic vinyl compounds (e.g., styrene), vinyl halides (e.g., vinyl chloride and vinyl bromide), vinylidene chloride, acrylonitrile, methacrylonitrile, and saturated carboxylic acid vinyl esters (e.g., vinyl acetate and vinyl propionate).

Furthermore, unsaturated carboxylic acid amides (e.g., acrylamide, methacrylamide, and itaconic acid amide), N-alkyl and/or N-alkylol derivatives of unsaturated carboxylic acid amides (e.g., N-methylacrylamide, N-isobutylacrylamide, N-methylolacrylamide, N-methylolmethacrylamide, and N-ethoxymethylacrylamide), unsaturated sulfonic acids (e.g., vinylsulfonic acid and methylacrylamidepropanesulfonic acid), and hydroxyl-containing unsaturated monomers (e.g., hydroxyethyl methacrylate and hydroxypropyl acrylate) can be used as unsaturated monomers (c). These monomers are effective to ensure solubilization of the resulting dispersed resin by addition of an alkali and/or an organic solvent.

These unsaturated monomers (c) may be used either individually or in combination of two or more thereof and are selected appropriately according to a degree of solubilization as desired and the end use of the resulting aqueous crosslinking resin composition. Unsaturated monomers (c) are used in a total proportion of not more than 97.5% by weight, not less than 30% by weight, based on the monomer mixture.

Emulsion polymerization for preparing aqueous resin dispersion (I) can be carried out by (A) a method of using an ordinary emulsifying agent or (B) a method of using a copolymer dispersant, and particularly a water-soluble or alkali-soluble carbonyl-containing copolymer dispersant.

Emulsifying agents which can be used in method (A) include anionic surface active agents, such as higher alcohol sulfates, alkylbenzenesulfonates, polyoxyethylene alkylsulfates, polyoxyethylene alkylphenol ether sulfates, vinylsulfonates, and vinylsulfosuccinates; and nonionic surface active agents, such as polyoxyethylene alkyl ethers, polyoxyethylene alkylphenol ethers, ethylene oxide-propylene oxide block copolymers, and sorbitan derivatives.

The copolymer dispersant which can be used in method (B) preferably includes copolymers comprising (i) from 0.5 to 99.5% by weight of a carbonyl-containing monomer unit having at least one carbonyl group based on aldo or keto group and one polymerizable double bond per molecule, (ii) from 0.5 to 99.5% by weight of a monomer unit selected from the group consisting of a unit derived from a mono-olefinic unsaturated carboxylic acid having from 3 to 5 carbon atoms, a unit derived from a mono-olefinic unsaturated carboxylic acid amide having from 3 to 5 carbon atoms, a unit derived from an N-alkyl and/or N-alkylol derivative of a mono-olefinic unsaturated carboxylic acid amide having from 3 to 5 carbon atoms, and an amino-containing monomer unit (e.g., N,N-dimethylaminoethyl methacrylate and N,N-diethylamino methacrylate), and (iii) not more than 70% by weight of a monomer unit selected from the group consisting of an alkyl acrylate or alkyl methacrylate unit having from 1 to 8 carbon atoms in the alkyl moiety thereof, an aromatic vinyl monomer unit, a vinyl halide unit, an ethylene unit, an acrylonitrile unit, a methacrylonitrile unit, a saturated carboxylic acid vinyl ester unit, a hydroxyl-containing monomer unit (e.g., hydroxyethyl acrylate or hydroxyethyl methacrylate), and a 1,3-diene unit. The copolymer dispersant can easily be prepared by emulsion polymerization of a monomer mixture comprising monomers (i) to (iii) in substantially the same proportion as mentioned above in water or an organic solvent, if desired, in the presence of an alkali, e.g., NaOH or aqueous ammonia.

Emulsion polymerization in accordance with either method (A) or (B) is carried out in an aqueous medium in the presence of a polymerization initiator. Polymerization initiators which can be used preferably include persulfates, such as potassium persulfate and ammonium persulfate; peroxides, such as hydrogen peroxide, benzoyl peroxide, cumene hydroperoxide, and t-butyl hydroperoxide; and azobisisobutyronitrile. In particular, water-soluble initiators and redox initiators are preferred.

Since the copolymer dispersant used in method (B) also takes part in crosslinkable, the aqueous crosslinking resin composition containing aqueous resin dispersion (I) prepared by method (B) is superior to that containing aqueous resin dispersion (I) prepared by method (A) in terms of physical properties of the crosslinked film.

The aqueous crosslinkable resin composition of the present invention can be prepared by mixing the thus prepared aqueous resin dispersion (I) with hydrazine derivative (II) having at least two hydrazino groups per molecule and by adding an alkali and/or an organic solvent to solubilize the resin content of aqueous resin dispersion (I) to a degree of at least 5% by weight.

Solubilization, i.e., addition of an alkali and/or an organic solvent, may be conducted before the commencement of emulsion polymerization for the preparation of aqueous resin dispersion (I), or before, simultaneously with, or after mixing of aqueous resin dispersion (I) and hydrazine derivative (II). In any case, the terminology "degree of solubilization" as used herein means a value determined as follows.

An aqueous resin dispersion is prepared under quite the same conditions as actually used for preparing an aqueous crosslinkable resin composition of the present invention, except for using no hydrazine derivative (II). The resulting resin dispersion is diluted with water so as to have a nonvolatile content of 15% by weight. The nonvolatile content (W part by weight) of the resulting diluted resin dispersion is measured. The diluted resin dispersion is centrifuged at centrifugal acceleration of $1.8 \times 10^5$ g (acceleration of gravity) for 60 minutes, and the nonvolatile content (w part by weight) in the supernatant liquid is measured. The degree of solubilization (wt %) is calculated from equation:

Degree of Solubilization $= w/W \times 100$ (wt %)

Alkalis which can be used for solubilization include inorganic water-soluble alkalis, e.g., sodium hydroxide and potassium hydroxide; inorganic salts capable of providing an alkaline aqueous solution, e.g., sodium hydrogencarbonate and sodium pyrophosphate; aqueous ammonia; and organic amines.

Organic solvents which can be used for solubilization include those compatible with water and those considerably soluble in water when those are not compatible completely (hereinafter simply referred to as "water miscible organic solvent"), such as alcohols, e.g., methyl alcohol, ethyl alcohol, n-propyl alcohol, isopropyl alcohol, n-butyl alcohol, sec-butyl alcohol, and ethylene glycol; cellosolves, e.g., methyl cellosolve, ethyl cellosolve, and butyl cellosolve, and esters thereof; carbitols, e.g., methylcarbitol, ethylcarbitol, and butylcarbitol, and esters thereof; tetrahydrofuran, dioxane, dimethylformamide, and ethyl acetate.

Solubilization may be effected by addition of the above-mentioned alkali alone, the above-mentioned organic solvent alone, or both of them. A preferred degree of solubilization is 10% by weight or more. If degree of solubilization is more than 5% by weight without an alkali and/or an organic solvent, it is not necessary to add an alkali and/or an organic solvent.

Hydrazine derivative (II) containing at least two hydrazino groups (hydrazine residual groups) per molecule includes dicarboxylic acid dihydrazides having from 2 to 10, preferably from 4 to 6, carbon atoms, which are dehydrating condensation products between a dicarboxylic acid and hydrazine (e.g., oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, and itaconic acid dihydrazide); and water-soluble aliphatic dihydrazines having from 2 to 4 carbon atoms (e.g., ethylene-1,2-dihydrazine, propylene-1,3-dihydrazine, and butylene-1,4-dihydrazine).

Also included in -hydrazine derivative (II) are hydrazino-containing polymers represented by formula:

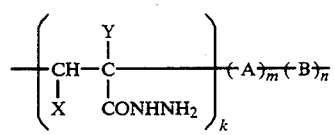

wherein X represents a hydrogen atom or a carboxyl group; Y represents a hydrogen atom or a methyl group; A represents a unit derived from acrylamide, methacrylamide, an acrylic ester, a methacrylic ester or maleic anhydride; B represents a unit derived from a monomer copolymerizable with the monomer of unit A; and k, m, and n each represents a number satisfying formulae:

2 mol % $\leq$ k $\leq$ 100 mol %

0 mol % $\leq$ (m+n) $\leq$ 98 mol %

(k+m+n) = 100 mol %

The details of these polymers are described, e.g., in JP-A-55-6535 (corresponding to U.S. Pat. No. 4,230,525).

The proportion of hydrazine derivative (II) in the aqueous crosslinking resin composition is preferably such that the molar ratio of the hydrazino groups to the carbonyl groups of aqueous resin dispersion (I), i.e., ($-NHNH_2$)/($>C=O$) molar ratio, falls within a range of from 0.05 to 5, and more preferably from 0.4 to 1.2.

If desired, the aqueous crosslinkable resin composition according to the present invention may further contain other aqueous resin dispersions, such as an aqueous resin dispersion obtained by general emulsion polymerization or a urethane resin emulsion, as long as the film properties of the composition are not impaired.

According to the end use, the aqueous crosslinkable resin composition of the present invention may furthermore contain various additives, such as dispersants, lubricants, anti-foaming agents, solvents, film formation aids, plasticizers, anti-freezing agents, thickeners, air entrainers, water reducing agents, quick-setting agents, crosslinking accelerators, retarders, and tackifiers.

The aqueous crosslinkable resin composition of the present invention finds various uses, with its crosslinkability being taken advantage of, as not only coating compounds but adhesives for plywood, woodworking adhesives, adhesives for paper or tapes, and fiber coating compounds.

The present invention will now be illustrated in greater detail with reference to Preparation Examples, Examples, and Comparative Examples. All the parts and percents are given by weight unless otherwise indicated.

PREPARATION EXAMPLE 1

In a reactor equipped with a temperature controller, an anchor stirrer, a reflux condenser, a feeder, a thermometer, and an inlet for nitrogen was charged 200 parts of water, and the reactor was then purged with nitrogen. The inner temperature was raised to 90° C. and mixture I having the following composition and an initiator solution comprising 2.5 parts of potassium persulfate and 85 parts of water were continuously fed to the reactor in small portions over a period of 3.5 hours to conduct a polymerization reaction. After completion of the addition, the mixture was kept at 90° C. for an additional period of 2 hours to complete the reaction to obtain an aqueous resin dispersion having a solids content of 50% (hereinafter designated resin dispersion A).

| Composition of Mixture I: | |
| --- | --- |
| Water | 200 parts |
| Sodium salt of a sulfuric acid half-ester of an ethylene oxide (20 mol) adduct of p-nonyl phenol (hereinafter referred to as anionic emulsifying agent A) (35% aqueous solution) | 30 parts |
| Ethylene oxide (25 mol) adduct of p-nonyl phenol (hereinafter referred to as nonionic emulsifying agent B) (20% aqueous solution) | 20 parts |
| Methyl methacrylate | 200 parts |
| Butyl acrylate | 140 parts |
| Diacetone acrylamide | 40 parts |
| Acrylic acid | 20 parts |

PREPARATION EXAMPLES 2 TO 7

Aqueous resin dispersions (designated resin dispersion B to G) were prepared in the same manner as for resin dispersion A of Preparation Example 1, except for changing the kinds and amounts of the unsaturated monomers and the dispersant as shown in Table 1 below.

PREPARATION EXAMPLES 8 TO 10

Aqueous resin dispersions (designated resin dispersion H to J) were prepared in the same manner as for resin dispersion A of Preparation Example 1, except for changing the kinds and amounts of the unsaturated monomers and the dispersant as shown in Table 2 below and a chain transfer agent as shown in the Table being added to composition of mixture.

PREPARATION EXAMPLE 11

In the same reactor as used in Preparation Example 1 were charged 300 parts of water and, as a copolymer dispersant, 40 parts of a 20% alkaline aqueous solution of a methyl methacrylate/butyl acrylate/diacetone acrylamide/acrylic acid copolymer (20/30/40/10; molecular weight: ca. 8,000) (hereinafter referred to as CD-1).

After purging the reactor with nitrogen, 10% of mixture II shown below was added thereto and heated to 90° C. Then, 10% of mixture III shown below was added thereto. The rest of mixture II and the rest of mixture III were simultaneously fed to the reactor in small portions over a period of 3 to 3.5 hours. After completion of the addition, the mixture was kept at 90° C. for an additional period of 1.5 hours to complete the reaction. The reaction mixture was cooled to room temperature to obtain an aqueous resin dispersion (designated resin dispersion K).

| Composition of Mixture II: | |
| --- | --- |
| Methyl methacrylate | 180 parts |
| Butyl acrylate | 150 parts |
| Diacetone acrylamide | 60 parts |
| Methacrylic acid | 10 parts |
| t-Dodecylmercaptan (chain transfer agent) | 0.1 part |
| Composition of Mixture III: | |
| Water | 120 parts |
| Sodium persulfate | 2.5 parts |
| Sodium hydroxide | 4 parts |

PREPARATION EXAMPLES 12 AND 13

Aqueous resin dispersions (designated resin dispersions L and M) were prepared in the same manner as in Preparation Example 11, except for replacing the copolymer dispersant CD-1 with a 25% alkaline aqueous solution of a methyl acrylate/diacetone acrylamide/acrylic acid copolymer (20/20/60; molecular weight: ca. 6,000) (hereinafter referred to as CD-2) and also changing the kinds and amounts of the unsaturated monomers and chain transfer agent as shown in Table 2.

PREPARATION EXAMPLE 14

In the same reactor as used in Preparation Example 1 was charged 200 parts of isopropyl alcohol. The contents of the reactor were heated to 80° C., and mixture IV shown below was continuously fed thereto over 3 hours while stirring. After the addition, the reaction mixture was further kept at 80° C. for an additional period of 1 hour to complete the reaction. The inner temperature was lowered to 30° C., and 60 parts of a 10% sodium hydroxide aqueous solution and 540 parts of water were added thereto to prepare an aqueous resin solution (designated resin solution N).

| Composition of Mixture IV: | |
| --- | --- |
| Methyl methacrylate | 100 parts |
| Butyl acrylate | 70 parts |
| Diacetone acrylamide | 20 parts |
| Acrylic acid | 10 parts |
| Azobisisobutyronitrile | 10 parts |

PREPARATION EXAMPLES 15 TO 24 and 26

Aqueous resin dispersions (designated resin dispersion O to X and Z) were prepared in the same manner as for resin dispersion A of Preparation Example 1, except for changing the kinds and amounts of the unsaturated monomers and the dispersant as shown in Tables 3 and 4 below.

PREPARATION EXAMPLE 25

In the same reactor as used in Preparation Example 1 was charged 400 parts of isopropyl alcohol. The contents of the reactor were heated to 80° C., and mixture V shown below was continuously fed thereto over 3 hours while stirring. After the addition, the reaction mixture was further kept at 80° C. for an additional period of 1 hour to complete the reaction. The inner temperature was lowered to 30° C., and 60 parts of a 10% sodium hydroxide aqueous solution and 540 parts of water were added thereto to prepare an aqueous resin solution (designated resin solution Y).

| Composition of Mixture V: | |
| --- | --- |
| Diacetone acrylamide | 120 parts |
| Acrylic acid | 280 parts |
| Azobisisobutyronitrile | 10 parts |

The composition of the polymerization system used for the preparation of resin dispersions A to M, O to X and Z and resin solutions N and Y and the solid content of these resin dispersions or solutions are shown in Tables 1 to 4 below.

TABLE 1

|  | Resin Dispersion A | Resin Dispersion B | Resin Dispersion C | Resin Dispersion D | Resin Dispersion E | Resin Dispersion F | Resin Dispersion G |
|---|---|---|---|---|---|---|---|
| Polymerization System (part): | | | | | | | |
| Monomers[1]: | MMA (200) | SM (120) | MMA (200) | MMA (140) | MMA (200) | MMA (200) | MMA (80) |
|  | BA (140) | 2EHA (80) | EA (100) | DAAM (240) | BA (100) | BA (136) | 2EHA (40) |
|  | DAAM (40) | DAAM (140) | BA (60) | AA (20) | AA (100) | ACR (4) | DAAM (120) |
|  | AA (20) | AA (60) | DAAM (40) |  |  | AA (60) | AA (160) |
| Dispersant[2]: | A (10.5) | SDBS (10) | A (8) | A (8) | A (8) | A (8) | A (4) |
|  | B (4) |  | B (4) | B (4) | B (4) | B (4) | B (8) |
| Chain transfer agent: | — | — | — | — | — | — | — |
| Solids content of resin dispersion (wt %): | 50 | 45 | 50 | 50 | 50 | 45 | 40 |

TABLE 2

|  | Resin Dispersion H | Resin Dispersion I | Resin Dispersion J | Resin Dispersion K | Resin Dispersion L | Resin Dispersion M | Resin Solution N |
|---|---|---|---|---|---|---|---|
| Polymerization System (part): | | | | | | | |
| Monomers[1]: | SM (120) | MMA (200) | SM (80) | MMA (180) | SM (90) | SM (200) | MMA (100) |
|  | 2EHA (70) | BA (140) | MMA (120) | BA (150) | MMA (90) | BA (120) | BA (70) |
|  | DAAM (90) | DAAM (40) | BA (120) | DAAM (60) | BA (100) | ACR (20) | DAAM (20) |
|  | MAA (120) | AA (20) | ACR (48) | MAA (10) | DAAM (60) | MAA (60) | AA (10) |
|  |  |  | MAA (32) |  | AA (60) |  |  |
| Dispersant[2]: | SDBS (10) | A (10.5) | SDBS (10) | CD-1 (40) | CD-2 (10) | CD-2 (10) | — |
|  |  | B (4) |  |  |  |  |  |
| Chain transfer agent[3]: | MPA (0.2) | MPA (0.5) | DM (0.2) | DM (0.1) | BM (0.3) | — | — |
| Solids content of resin dispersion (wt %): | 40 | 50 | 50 | 47 | 45 | 45 | 20 |

TABLE 3

|  | Resin Dispersion O | Resin Dispersion P | Resin Dispersion Q | Resin Dispersion R | Resin Dispersion S | Resin Dispersion T |
|---|---|---|---|---|---|---|
| Polymerization System (part): | | | | | | |
| Monomers[1]: | MMA (165) | MMA (200) | MMA (204) | MMA (44) | MMA (150) |  |
|  | BA (153) | 2EHA (120) | BA (160) | SM (50) | EA (210) | 2EHA (80) |
|  | DAAM (40) | DAAM (24) | DAAM (12) | 2EHA (106) | ACR (8) | DAAM (140) |
|  | AA (32) | MAA (56) | AA (12) | DAAM (100) | AA (20) | AA (180) |
|  | AAM (10) |  | IA (12) | MAA (100) | HEA (12) |  |
| Dispersant[2]: | A (10.5) | SDBS (10) | A (8) | A (8) | A (8) | A (6) |
|  | B (4.0) |  | B (4) | B (4) | B (4) | B (5) |
| Chain transfer agent[3]: | DM (2.4) | DM (2.0) | DM (5.2) | MPA (0.8) | IPA (8.0) | MPA (0.2) |
| Solids content of resin dispersion | 50 | 50 | 50 | 50 | 50 | 50 |

TABLE 3-continued

|  | Resin Dispersion O | Resin Dispersion P | Resin Dispersion Q | Resin Dispersion R | Resin Dispersion S | Resin Dispersion T |
|---|---|---|---|---|---|---|
| (wt %): | | | | | | |

TABLE 4

|  | Resin Dispersion U | Resin Dispersion V | Resin Dispersion W | Resin Dispersion X | Resin Dispersion Y | Resin Dispersion Z |
|---|---|---|---|---|---|---|
| Polymerization System (part): | | | | | | |
| Monomers[1]: | MMA (193) BA (153) DAAM (40) AA (14) | 2EHA (80) DAAM (60) AA (260) | MMA (160) BA (168) MAA (72) | MMA (8) 2EHA (92) DAAM (260) IA (40) | DAAM (120) AA (280) | MMA (193) BA (153) DAAM (40) AA (14) |
| Dispersant[2]: | A (8) B (4) | A (8) B (4) | A (8) B (4) | A (8) B (4) | — | A (8) B (4) |
| Chain transfer agent[3]: | — | DM (2.0) | DM (20) | IPA (2.0) | MPA (8.0) | DM (2.0) |
| Solids content of resin dispersion (wt %): | 50 | 50 | 50 | 50 | 35 | 50 |

Note (common to Tables 1 to 4):
[1]:
MMA: Methyl methacrylate
BA: Butyl acrylate
DAAM: Diacetone acrylamide
AA: Acrylic acid
SM: Styrene
ACR: Acrolein
EA: Ethyl acrylate
MAA: Methacrylic acid
2EHA: 2-Ethylhexyl acrylate
IA: Itaconic acid
AAM: Acrylamide
HEA: 2-Hydroxyethyl acrylate
[2]:
A: Anionic emulsifying agent A
B: Nonionic emulsifying agent B
SDBS: Sodium dodecylbenzenesulfonate
[3]:
MPA: Mercaptopropionic acid
DM: t-Dodecylmercaptan
BM: t-Butylmercaptan
IPA: Isopropyl alcohol

EXAMPLE 1

A hundred parts of resin dispersion J was adjusted to pH 7.0 with an aqueous ammonia solution, and 30 parts of methyl cellosolve was added thereto. Four parts of adipic acid dihydrazide were further added thereto. The mixture was diluted with water so as to have a nonvolatile content of 25% to prepare a crosslinkable resin composition. The terminology "nonvolatile content" as used here and the following Examples means a weight percentage of a residue when a resin composition is dried at 140° C. for 30 minutes.

EXAMPLES 2 TO 17 AND COMPARATIVE EXAMPLES 1 TO 10

Crosslinkable resin compositions were prepared in the same manner as in Example 1, except for making the alterations shown in Tables 5 to 9 below (the resin composition of Comparative Example 2 was non-crosslinkable composition).

Each of the resin compositions obtained in Examples 1 to 17 and Comparative Examples 1 to 10 was evaluated in accordance with the following test methods. The results obtained are shown in Tables 5 to 9.

1) Water Resistance of Dry Film

The resin composition was coated on a glass plate to a dry thickness of 500 μm and dried at 20° C. for 1 week. The dry film was punched to prepared a 5-by-5 cm square specimen. The specimen was immersed in water at 20° C. for 1 day, and the water absorption (wt %) was measured.

2) Solvent Resistance of Dry Film

The same specimen as prepared in 1) above was immersed in toluene for 1 day, and the coefficient of linear expansion (%) of the side was measured.

3) Adhesion of Dry Film to Substrate

The resin composition was coated on a polypropylene plate (hereinafter abbreviated as PP plate) or a polyester plate (hereinafter abbreviated as PET plate) to a dry thickness of 20 μm and dried at 20° C. for 1 week. A peel test of the dry film on the substrate was conducted using an adhesive tape "Cello-Tape" (produced by Nichiban Co., Ltd.), and the results were rated as follows.

A ... No peeling occurred at all.
B ... Peeling occurred on part of the film.
C ... Peeling occurred on the entire film.

4) Hardness of Dry Film

The resin composition was coated on a steel plate to a dry thickness of 20 μm and dried at 20° C. for 1 week. The film on the substrate was scratched with a pencil to evaluate hardness according to JIS K-5400.

5) Whitening Resistance of Dry Film

The same specimen as prepared in 1) above was immersed in water at 20° C. for 2 days, and the whitening condition are evaluated in terms of change of color tone. The results were rated as follows.

A ... No whitening occurred at all.
B ... Whitening slightly occurred.
C ... Whitening occurred.

TABLE 5

|  | Example 1 | Compar. Example 1 | Example 2 | Example 3 |
|---|---|---|---|---|
| Aqueous Crosslinkable Resin Composition: |  |  |  |  |
| Resin dispersion (part) | J (100) | C (100) | G (100) | I (100) |
| Alkali (pH) | aq. ammonia (7.0) | aq. ammonia (9.0) | — | NaOH (9.0) |
| Organic solvent (part) | methyl cellosolve (30) | isopropyl alcohol (20) | isopropyl alcohol (30) | — |
| Degree of Solubilization (%) | 60 | ca. 2 | 68 | 60 |
| Hydrazine derivative (part) | ADH* (4) | ADH (3) | ADH (6.2) | ADH (3) |
| (—NHNH$_2$)/(>C=O) molar ratio | 0.4 | 1.1 | 1.0 | 1.1 |
| Nonvolatile content (%) | 25 | 30 | 20 | 25 |
| Film Properties: |  |  |  |  |
| Water resistance | 21 | 17 | 81 | 14 |
| Solvent resistance (%) | 25 | 48 | 13 | 31 |
| Adhesion to PP plate | A | B | A | A |
| Adhesion to PET plate | A | C | A | A |
| Hardness | 3H | HB | H | 2H |
| Whitening Resistance | A | B | A | B |

TABLE 6

|  | Compar. Example 2 | Example 4 | Compar. Example 3 | Compar. Example 4 |
|---|---|---|---|---|
| Aqueous Crosslinkable Resin Composition: |  |  |  |  |
| Resin dispersion (part) | A (100) | D (100) | E (100) | N (100) |
| Alkali (pH) | NaOH (8.5) | aq. ammonia (8.5) | aq. ammonia (9.0) | NaOH (9.5) |
| Organic solvent (part) | butyl cellosolve (10) | methyl cellosolve (10) | — | — |
| Degree of Solubilization (%) | 24 | 70 | 100 | 100 |
| Hydrazine derivative (part) | — | ADH (5) | ADH (3) | ADH (1.5) |
| (—NHNH$_2$)/(>C=O) molar ratio | — | 0.3 | 0 | 1.4 |
| Nonvolatile content (%) | 30 | 25 | 25 | 20 |
| Film Properties: |  |  |  |  |
| Water resistance (%) | 48 | 94 | 250 | 145 |
| Solvent resistance (%) | dissolved | 21 | dissolved | 120 |
| Adhesion to PP plate | B | A | B | A |
| Adhesion to PET plate | C | B | B | B |
| Hardness | B | 2H | 2H | HB |
| Whitening resistance | C | A | A | C |

TABLE 7

|  | Example 5 | Example 6 | Example 7 | Example 8 | Example 9 | Example 10 |
|---|---|---|---|---|---|---|
| Aqueous Crosslinkable Resin Composition: |  |  |  |  |  |  |
| Resin dispersion (part) | I (100) | F (100) | M (100) | L (100) | B (100) | H (100) |
| Alkali (pH) | — | NaOH (6.5) | aq. ammonia (8.0) | NaOH (6.0) | aq. ammonia (6.0) | — |
| Organic solvent (part) | isopropyl alcohol (20) | butyl cellosolve (10) | — | isopropyl alcohol (20) | isopropyl alcohol (20) | isopropyl alcohol (30) |
| Degree of Solubilization (%) | 37 | 73 | 24 | 68 | 82 | 29 |
| Hydrazine derivative (part) | ADH (3) | PAH** (6) | ADH (4) | PAH (4.0) | ADH (8) | ADH (5) |
| (—NHNH$_2$)/(>C=O) molar ratio | 1.1 | 0.8 | 1.1 | 1.0 | 1.0 | 1.1 |
| Nonvolatile content (%) | 25 | 25 | 25 | 25 | 25 | 20 |
| Film Properties: |  |  |  |  |  |  |
| Water resistance (%) | 17 | 18 | 21 | 29 | 31 | 42 |
| Solvent resistance (%) | 28 | 85 | 25 | 18 | 12 | 15 |
| Adhesion to PP plate | A | A | A | A | A | A |
| Adhesion to PET plate | A | B | A | A | A | A |
| Hardness | 2H | 2H | 2H | 3H | 2H | 2H |
| Whitening resistance | B | A | B | A | A | A |

TABLE 8

|  | Example 11 | Example 12 | Example 13 | Example 14 | Example 15 | Example 16 |
|---|---|---|---|---|---|---|
| Aqueous Crosslinkable Resin Composition: | | | | | | |
| Resin dispersion (part) | O (100) | P (100) | Q (100) | R (100) | S (100) | T (100) |
| Alkali (pH) | aq. ammonia (9.0) | aq. ammonia (8.5) | aq. ammonia (9.5) | NaOH (7.5) | aq. ammonia | — |
| Organic solvent (part) | butyl cellosolve (7) | isopropyl alcohol (5) | butyl cellosolve (15) | — | methyl cellosolve (12) | butyl cellosolve (20) |
| Degree of Solubilization (%) | 25 | 68 | 10 | 95 or more | 7 | 95 or more |
| Hydrazine derivative (part) | ADH (2.1) | ADH (1.7) | ADH (2.3) | SDH*** (0.9) | ADH (9.3) | ADH (0.6) |
| ($-NHNH_2$)/($>C=O$) molar ratio | 0.8 | 1.1 | 3.0 | 0.1 | 6.0 | 0.7 |
| Nonvolatile content (%) | 25 | 25 | 25 | 25 | 25 | 25 |
| Film Properties: | | | | | | |
| Water resistance (%) | 18 | 20 | 7 | 35 | 5 | 80 |
| Solvent resistance (%) | 42 | 48 | 60 | 89 | 80 | 150 |
| Adhesion to PP plate | A | A | B | A | B | A |
| Adhesion to PET plate | A | A | A | A | A | A |
| Hardness | H | H | H | H | 2H | H |
| Whitening resistance | A | A | A | A | A | A |

TABLE 9

|  | Compar. Example 5 | Compar. Example 6 | Compar. Example 7 | Compar. Example 8 | Compar. Example 9 | Compar. Example 10 | Example 17 |
|---|---|---|---|---|---|---|---|
| Aqueous Crosslinkable Resin Composition: | | | | | | | |
| Resin dispersion (part) | S (100) | U (100) | V (100) | W (100) | X (100) | Y (100) | Z (100) |
| Alkali (pH) | — | aq. ammonia (9.0) | NaOH (8.0) | aq. ammonia (8.5) | aq. ammonia (8.0) | aq. ammonia (8.0) | aq. ammonia (9.0) |
| Organic solvent (part) | texanol (8) | butyl cellosolve (10) | butyl cellosolve (8) | butyl cellosolve (7) | butyl cellosolve (8) | isopropyl alcohol (7) | butyl cellosolve (10) |
| Degree of Solubilization (%) | 3 | 2.5 | 100 | 80 | 50 | 100 | 8 |
| Hydrazine derivative (part) | ADH (2.0) | ADH (2.6) | ADH (3.5) | ADH (2.5) | ADH (4.6) | ADH (7.7) | ADH (2.6) |
| ($-NHNH_2$)/($>C=O$) molar ratio | 1.3 | 1.0 | 0.9 | — | 0.3 | 1.4 | 1.0 |
| Nonvolatile content (%) | 25 | 25 | 25 | 25 | 25 | 25 | 25 |
| Film Properties: | | | | | | | |
| Water resistance (%) | 4 | 4 | dissolved | 30 | 22 | dissolved | 5 |
| Solvent resistance (%) | 120 | 40 | 42 | dissolved | 32 | 30 | 50 |
| Adhesion to PP plate | C | C | A | C | C | B | B |
| Adhesion to PET plate | B | B | A | B | B | B | A |
| Hardness | H | H | 2H | B | B | 3H | H |
| Whitening resistance | C | C | A | B | C | dissolved | B |

Note:
*Adipic acid dihydrazide
**30% isopropyl alcohol solution of a polyhydrazine compound obtained by reacting polymethyl acrylate (molecular weight: about 8,000) with hydrazine hydrate to a modification degree of about 30 mol %.
***Sebacic-acid dihydrazide The aqueous crosslinkable resin composition according to the present invention easily undergoes crosslinking between a carbonyl group and a hydrazino group at room temperature to form a crosslinked film. The crosslinked film exhibits excellent adhesion to a substrate, well-balanced resistance to water and solvents, excellent whitening resistance, and satisfactory hardness. Therefore, the aqueous crosslinkable resin composition of the invention is highly useful as primers for plastics and metals, coating compounds for repairs of coatings, and the like.

While the invention has been described in detail and with reference to specific examples thereof, it will be apparent to one skilled in the art that various changes and modifications can be made therein without departing from the spirit and scope thereof.

What is claimed is:

1. An aqueous crosslinkable resin composition consisting essentially of (I) an aqueous resin dispersion obtained by emulsion polymerization of a monomer mixture consisting of (a) 2 to 50% by weight of an unsaturated carboxylic acid monomer having 3–5 carbon atoms, (b) 0.5 to 60% by weight of a carbonyl-containing unsaturated monomer containing at least one carbonyl group based on an aldo group or a keto group, and (c) the remainder of at least one monomer(s) selected from the group consisting of alkyl acrylates or methacrylates having from 1 to 8 carbon atoms in the alkyl moiety thereof, glycidyl methacrylate, glycol mono- or diacrylates, glycol mono- or dimethacrylates, aromatic vinyl compounds, vinyl halides, vinylidene chloride, acrylonitrile, methacrylonitrile, saturated carboxylic acid vinyl esters, unsaturated carboxylic acid amides, N-alkyl and/or N-alkylol compounds of unsaturated carboxylic acid amides, unsaturated sulfonic acids, and hydroxyl-containing unsaturated compounds and (II) a hydrazine compound having at least two hydrazino groups (—NHNH$_2$) per molecule, with the molar ratio of the hydrazine group in said hydrazine compound (II) to the carbonyl group in the resin of said aqueous resin dispersion (I) being from 0.05 to 5, and with the resin content in the aqueous resin dispersion (I) having been solubilized to a degree of at least 5% by weight by addition of sufficient amount of an alkali and/or water miscible organic solvent.

2. An aqueous crosslinkable resin composition as claimed in claim 1, wherein said aqueous resin dispersion (I) is obtained by emulsion polymerization of a monomer mixture consisting of (a) 5 to 15% by weight of an unsaturated carboxylic acid monomer having 3–5 carbon atoms, (b) 2 to 30% by weight of a carbonyl-containing unsaturated monomer containing at least one carbonyl group based on an aldo group or a keto group, and (c) the remainder of at least one monomer(s) selected from the group consisting of alkyl acrylates or methacrylates having from 1 to 8 carbon atoms in the alkyl moiety thereof, glycidyl methacrylate, glycol mono- or diacrylates, glycol mono- or dimethacrylates, aromatic vinyl compounds, vinyl halides, vinylidene chloride, acrylonitrile, methacrylonitrile, saturated carboxylic acid vinyl esters, unsaturated carboxylic acid amides, N-alkyl and/or N-alkylol compounds of unsaturated carboxylic acid amides, unsaturated sulfonic acids, and hydroxyl-containing unsaturated compounds in the presence of a chain transfer agent.

3. An aqueous crosslinkable composition as claimed in claim 1, wherein said resin dispersion (I) is obtained by emulsion polymerization of a monomer mixture consisting of (a) 15 to 30% by eight of an unsaturated carboxylic acid monomer having 3–5 carbon atoms, (b) 2 to 30% by weight of a carbonyl-containing unsaturated monomer containing at least one carbonyl group based on an aldo group or a keto group, and (c) the remainder of at least one monomer(s) selected from the group consisting of alkyl acrylates or methacrylates having from 1 to 8 carbon atoms in the alkyl moiety thereof, glycidyl methacrylate, glycol mono- or diacrylates, glycol mono- or dimethacrylates, aromatic vinyl compounds, vinyl halides, vinylidene chloride, acrylonitrile, methacrylonitrile, saturated carboxylic acid vinyl esters, unsaturated carboxylic acid amides, N-alkyl and/or N-alkylol compounds of unsaturated carboxylic acid amides, unsaturated sulfonic acids, and hydroxyl-containing unsaturated compounds.

4. An aqueous crosslinkable resin composition as claimed in claim 2, wherein said component (b) is present in an amount of 4 to 20% by weight.

5. An aqueous crosslinkable resin composition as claimed in claim 3, wherein said component (b) is present in an amount of 4 to 20% by weight.

6. An aqueous crosslinkable resin composition as claimed in claim 3, wherein said aqueous resin dispersion (I) is a resin dispersion obtained by emulsion polymerization in the presence of a chain transfer agent.

7. An aqueous crosslinkable resin composition as claimed in claim 2, wherein said chain transfer agent is present in an amount of from 0.01 to 3 parts by weight per 100 parts by weight of the solid resin content.

8. An aqueous crosslinkable resin composition as claimed in claim 6, wherein said chain transfer agent is present in an amount of from 0.01 to 3 parts by weight per 100 parts by weight of the solid resin content.

9. An aqueous crosslinkable resin composition as claimed in claim 1, wherein the resin content in said aqueous resin dispersion (I) has been solubilized to a degree of 10% by weight or more.

10. An aqueous crosslinkable resin composition as claimed in claim 1, wherein the molar ratio of the hydrazino group in said hydrazine compound (II) to the carbonyl group in the resin of said aqueous resin dispersion (I) is from 0.4 to 1.2.

11. An aqueous crosslinkable resin composition as claimed in claim 1, wherein said aqueous resin dispersion (I) is a resin dispersion obtained by emulsion polymerization using, as a dispersant, a copolymer comprising (i) from 0.5 to 99.5% by weight of a carbonyl-containing monomer unit having at least one carbonyl group based on aldo or keto group and one polymerizable double bond per molecule, (ii) from 0.5 to 99.5% by weight of a monomer unit selected from the group consisting of a mono-olefinic unsaturated carboxylic acid having from 3 to 5 carbon atoms, a mono-olefinic unsaturated carboxylic acid amide having from 3 to 5 carbon atoms, an N-alkyl and/or N-alkylol compound of a mono-olefinic unsaturated carboxylic acid amide having from 3 to 5 carbon atoms, and an amino-containing monomer unit, and (III) not more than 70% by weight of a monomer unit selected from the group consisting of an alkyl acrylate or alkyl methacrylate unit having from 1 to 8 carbon atoms in the alkyl moiety thereof, an aromatic vinyl monomer unit, a vinyl halide unit, an ethylene unit, an acrylonitrile unit, a methacrylonitrile unit, a saturated carboxylic acid vinyl ester unit, a hydroxyl-containing monomer unit, and a 1,3-diene unit.

* * * * *